United States Patent [19]

Bezon

[11] Patent Number: 4,685,386
[45] Date of Patent: Aug. 11, 1987

[54] AUTOMATIC APPARATUS FOR THE CONTINUOUS COOKING OF INDIVIDUAL FOOD PORTIONS BY BOILING OR FRYING

[76] Inventor: Jacques Bezon, Campagne Chantavert, 83880 Meounes, France

[21] Appl. No.: 709,346

[22] Filed: Mar. 6, 1985

[30] Foreign Application Priority Data

Mar. 13, 1984 [FR] France ................................ 84 03974
Feb. 14, 1985 [FR] France ................................ 85 02388

[51] Int. Cl.⁴ ............................................. A47J 37/12
[52] U.S. Cl. ........................................ 99/404; 99/407; 99/409; 99/443 C
[58] Field of Search ................. 99/355, 404, 407, 409, 99/427, 443 C; 426/523

[56] References Cited

U.S. PATENT DOCUMENTS

| | | | |
|---|---|---|---|
| 2,614,485 | 10/1952 | Sinkwitz | 99/404 |
| 2,692,603 | 10/1954 | Foote | 134/158 |
| 3,022,722 | 2/1962 | Arvan | 99/404 X |
| 3,036,513 | 5/1962 | Reeves | 99/404 |
| 3,296,954 | 1/1967 | Haub et al. | |
| 3,635,148 | 1/1972 | Fenerli | |
| 4,209,687 | 9/1981 | Takahashi | 134/157 |

FOREIGN PATENT DOCUMENTS

2227093  6/1972  Fed. Rep. of Germany ........ 99/404

*Primary Examiner*—Timothy F. Simone
*Attorney, Agent, or Firm*—Young & Thompson

[57] ABSTRACT

Automatic apparatus for the continuous cooking of individual food portions. The apparatus contains suspended baskets into which the food is placed, and the baskets are guided on a horizontal wheel. The wheel is rotated such that the baskets are moved through a container of boiling liquid to cook the food. After the baskets are withdrawn, the food is emptied onto plates on another rotating wheel contained at a lower level than the first horizontal wheel. Various ways of emptying the containers are taught including turning the containers over, and constructing the containers with bottoms that slide so as to allow the food to fall onto the plate. In a further embodiment, a lower guide ramp is used to secure the bottom of the containers. The ramp is discontinuous at the place where the food is to be emptied onto the plates.

8 Claims, 20 Drawing Figures

FIG 1

Section III—III

FIG 4

Section II—II

FIG 3

Section I—I

AUTOMATIC APPARATUS FOR THE CONTINUOUS COOKING OF INDIVIDUAL FOOD PORTIONS BY BOILING OR FRYING

The invention has as its object an automatic apparatus for the continuous cooking of individual food portions by boiling and/or frying. The apparatus is designed for use by restaurants.

It is known that cooking for groups of people often loses its quality, which is not necessarily due to the ingredients used, but to the too large quantity of foodstuffs which are cooked at the same time. Other factors besides cooking can also occur, such as: cooling down, too large plates, etc.

At present, foodstuffs cooked by boiling and/or frying, for example in oil or water, are cooked in advance in dishes of large capacity and said foodstuffs are reheated according to the customers' demands.

The invention seeks to overcome these problems, it does not have as its object to overcome problems related to industrial cooking.

On the contrary, for restaurants, the invention allows cooking individual food portions according to the demand of each customer of the restaurant.

The apparatus according to the invention comprises a vessel containing the liquid used for boiling and/or frying by heating means, the individual food portions to be cooked are disposed in baskets, said baskets being carried by rotary means to be immersed in said vessel for a predetermined and controllable period of time, said rotating path forcing the baskets to pass through a forced mechanical passage which empties said baskets of their food portions, said cooked food portions falling one after another onto warm plates which are automatically positioned below the falling point of the cooked food portion.

Said emptying of the cooked food portions out of the baskets can be accomplished by turning over said baskets or by opening one of the side walls or the bottom.

The baskets are open at the top and all the other baskets and the bottom are provided with several holes. The basket can comprise an arm or lug which, when the basket reaches the level of the forced passage, operates a means for emptying said basket of the cooked food portion.

Said arm or lug of the basket can effect the inversion by rotation so that the basket is emptied from the top which is open.

Said arm or lug can also cause the opening of the bottom of the basket which in this case, is removable. In this manner, the bottom of the basket can be mounted on a hinge on whose axle said arm is mounted and fixed thereto.

Said baskets can be suspended at the periphery of a horizontal wheel, called a basket-carrying wheel, whose rotation above the vessel allows immersing said baskets, circulating them in the boiling liquid, and subsequently draining them.

A forced mechanical passage ensures the opening of the bottom of the baskets by swinging the arm fixed to the axle constituting the hinge of the bottom of said basket. An emptying funnel receives the cooked food portion falling from the basket.

Another horizontal wheel rotating in the opposite direction than the first basket-carrying wheel and disposed on a lower plane, carries the warm plates which are positioned in front of the emptying funnel just at the moment when the cooked food portion of a basket is emptied.

Motors ensure the rotation of the basket-carrying wheel and the plate-carrying wheel in a synchronized manner.

The method of use of the apparatus consists in
filling the baskets from the top with foodstuffs (for example fresh pastry or French fries)
the motors ensure rotation of the wheels; one wheel ensures cooking be steeping in the boiling and/or frying liquid in the vessel, the other wheel carries the plates which are filled one after another with a cooked food portion. The process allows cooking the foodstuffs by boiling and/or frying in a continuous automatic manner, one portion after another.

The phases of the process are as follows:
passing the baskets in open air for filling them manually with foodstuffs to be cooked
immersion and circulation in the boiling and/or frying liquid
withdrawing from the bath and draining
emptying the cooked food portions from the baskets onto plates
repeating the process continuously, filling the baskets
. . .

According to another embodiment the basket suspended from the horizontal wheel, called the basket-carrying wheel, is no longer guided by one guiding ramp only but by two ramps. An upper guiding ramp ensures the movement of said basket about its clamping point, at the level of the handle and the hook with respect to the vertical axis. This movement allows moving said basket into and out of the cooking liquid. Likewise a lower guiding ramp ensures holding or opening the bottom of the basket which is mounted on a hinge. The suspended basket is likewise completely immersed in the cooking liquid. This total immersion of the basket ensures a better cooking of the foodstuffs thanks to the agitation due to boiling and the continuous movement of said basket in the liquid. As the upper part of the basket is open during its passage in total immersion, the basket passes through a tunnel whose upper wall closes the basket by serving as a lid. Only a central slot suitably disposed along the longitudinal axis of the tunnel allows the passage of the handle or the hanging arm which joins together the basket its hook and the horizontal wheel called the basket-carrying wheel. Said tunnel is provided with holes, thus it can be made of a grid material.

The heating resistors are surrounded by a pierced vertical cylindrical wall. This pierced vertical cylindrical wall ensures the circulation of the boiling cooking liquid and the agitation of the foodstuffs to be cooked, therefore ensuring a homogeneous cooking. This mixing and circulation are increased when a basket passes over the heating resistors, on the one hand through the pierced vertical cylindrical wall and, on the other hand, through the immersed tunnel.

Preferably the basket has a square shape, the upper part being open. The side walls are constituted by mountings or uprights to which a grid is welded. The bottom of the suspended basket is mounted on a free hinge, without a spring; it has therefore to be held by some means in order to remain in a closed position. Said means is the lower ramp which is positioned below the basket and keeps the bottom of said basket closed. This lower ramp is almost parallel to the upper guiding ramp. Except to the right of the emptying station of the food portion from the basket, where the lower ramp is discontinuous, therefore releasing the bottom, which can be opened. After emptying, the lower ramp gradually closes the bottom of said basket again, ensuring in this manner its closure.

The suspended basket is held by a jointed handle. The head of the handle is coupled to a clamping hook fixed to the basket-carrying wheel.

A sealing and locking means can prevent the head of the handle from slipping out of the hook.

A cover is positioned on top of the vessel for the liquid so as to reduce the evaporation rate, the energy costs and increase the heating capacity. Said cover is notched at its center so as to allow the passage of the basket handles.

The accompanying drawings given as an illustrative but non-limiting example will allow understanding the invention easily. They show preferred embodiments according to the invention.

The vessel 1 contains a liquid for example oil/or water heated by any heating means 2 (fuel, wood, gas, electricity). The food portions 3 are manually placed in baskets 4. These baskets 4 are carried by a rotary means 5 so as to be immersed in said vessel 1, for a predetermined and controllable period of time. The rotary means is a horizontal wheel 5 called a "basket-carrying wheel", which is rotatable. Said baskets 4 are suspended therefrom, at the periphery 6 of said wheel 5 provided with hooks 7. In this manner, in FIG. 1, there are eight suspended baskets 4.

Figure 1:
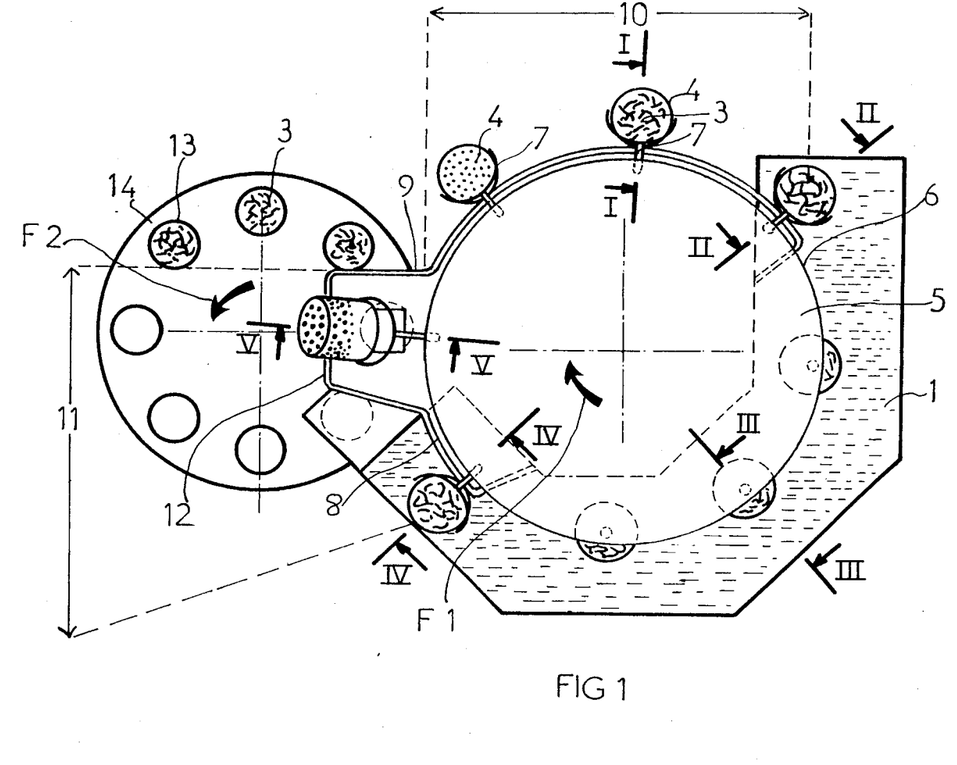
FIG. 1 is a plan view of the apparatus.
Figure 2:
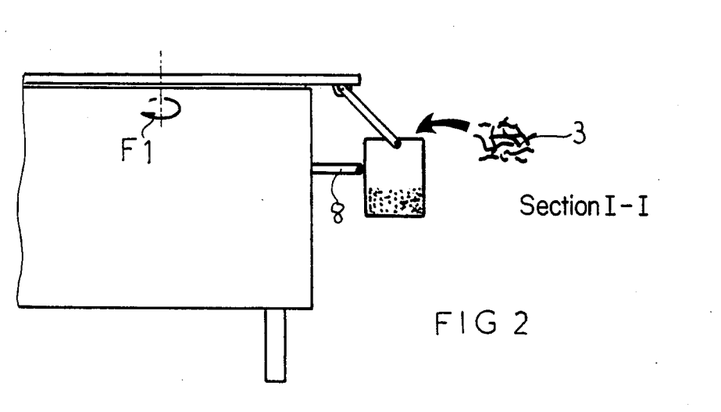
FIG. 2 is a partially sectional view along the axis I—I shown in FIG. 1.
Figure 3:
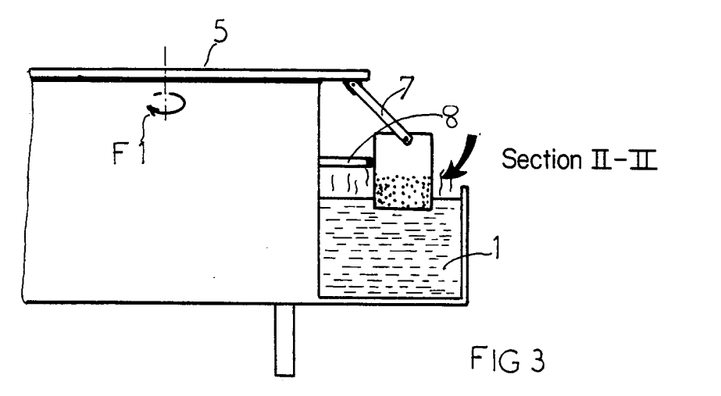
FIG. 3 is a partially sectional view along the axis II—II shown in FIG. 1.
Figure 4:
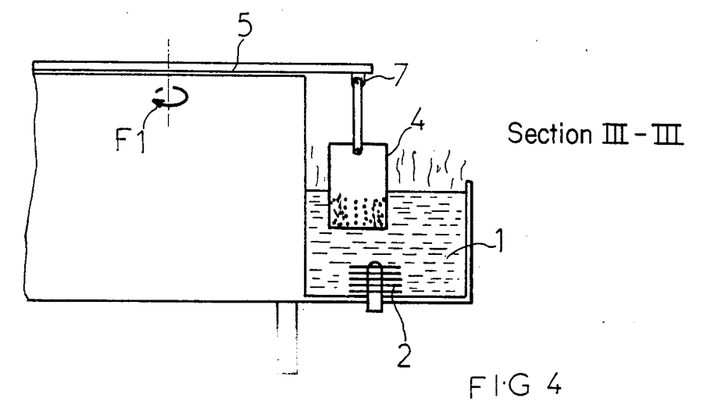
FIG. 4 is a partially sectional view along the axis III—III shown in FIG. 1.
Figure 5:
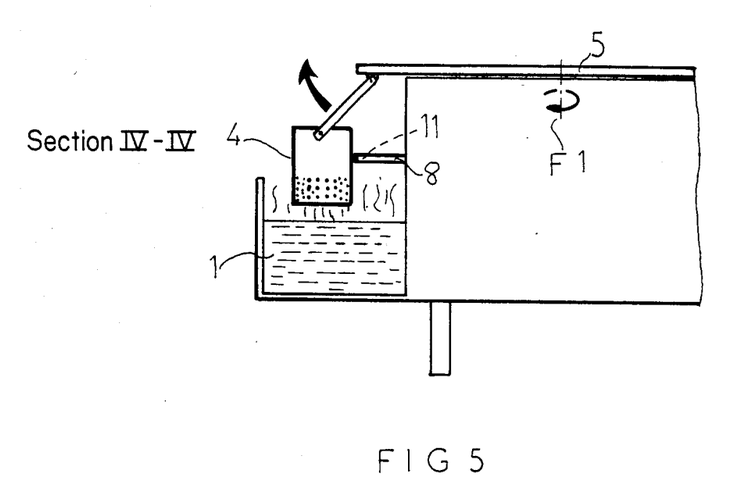
FIG. 5 is a partially sectional view along the axis IV—IV shown in FIG. 1.
Figure 6:
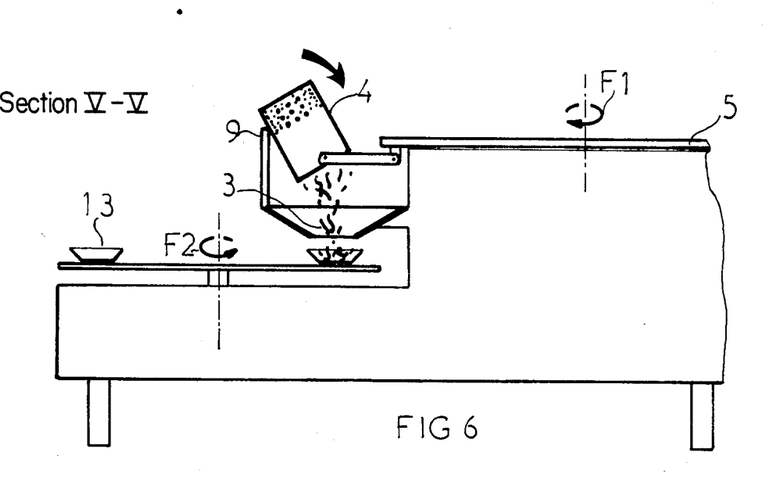
FIG. 6 is a partially sectional view along the axis V—V shown in FIG. 1.

A forced mechanical passage 8 forces the baskets 4 to be taken in or out of the vessel 1 and to be emptied above an emptying funnel 9. In FIG. 1, the forced passage 8 is a guiding ramp. In its first part 10, the ramp 8 is downward sloping so as to allow the baskets 4 to be gradually lowered into the vessel 1; then it slopes upwardly in a second part 11 so as to allow draining the baskets 4. Finally, in the part 12, the ramp 8 allows emptying the cooked food portions 3 from the baskets 4, the ramp 8 raises the basket 4 and forces it to be released from the wheel 5, subsequently to invert to empty its cooked food portion 3.

The basket 4 is emptied of its cooked food portion 3 in the emptying funnel 9.

Below the funnel 9 there is a warm plate 13. These plates 13 are disposed on another horizontal wheel 14, called a plate-carrying wheel, which is disposed in a lower plane than the plane of the basket-carrying wheel 5. This plate-carrying wheel 14 rotates in the direction F2 opposite to the direction of rotation F1 of the basket-carrying wheel 5. For this purpose, an electric motor drives the basket-carrying wheel 5 on its axle 15 in the direction F1, while a pinion 16 fixed to said driving axle 15 drives a double pinion 18, 19 through a chain 17. Said pinion 19 causes the axle 20 of the plate-carrying wheel 14 to turn in the direction F2. The wheels 14 and 5 rotate in a synchronized manner so that an empty plate 13 is automatically positioned below the emptying funnel 9 when one of the baskets 4 is emptied. In FIG. 1, the guiding ramp 8 allows inverting said basket 4 which is therefore emptied from the top which constitutes its opening. In this embodiment, the basket is round.

FIGS. 2, 3, 4, 5 and 6 allow understanding easily the operation and the technical characteristics of the apparatus during the various operational phases.

Figure 7A:
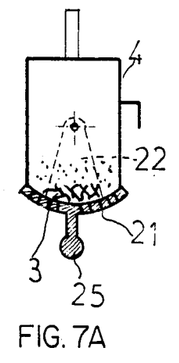
FIGS. 7A, 7B, and 7C are views of another embodiment of the basket showing the mechanism for opening its bottom.
Figure 7B:
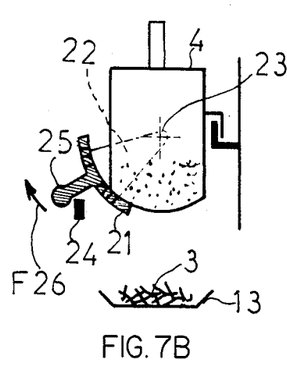
Figure 7C:
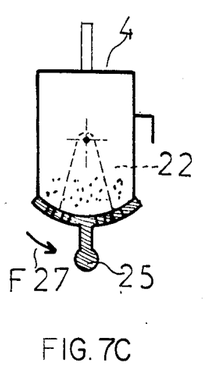
Figure 8A:
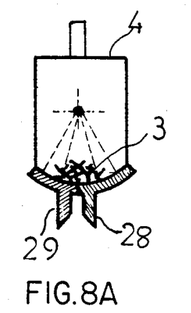
FIGS. 8A, 8B and 8C are views of another embodiment of the basket showing the mechanism for opening its bottom, in this case, the bottom of the basket is divided into two parts.
Figure 8B:
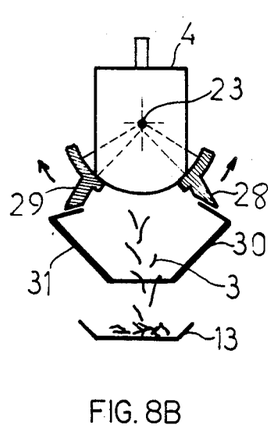
Figure 8C:
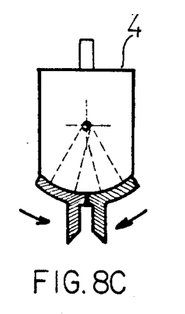

FIGS. 7A, 7B and 7C show a basket 4 which opens at the bottom. This basket comprises a removable swingable bottom 21 which is mounted on the body of the basket by means of side plates 22 fixed to a rotation axle 23 of the basket 4 by a lug 25 and causing said bottom 21 to swing according to the arrow F26, so as to allow the food portion 3 to fall onto the plate 13. The suspended basket 4 leaves the forced passage 24 allowing the bottom 21 to return to its original position through its own weight, according to the arrow F27, and therefore closing the basket 4. FIGS. 8A, 8B and 8C are is a different embodiment of the basket 4 shown in FIGS. 7A, 7B and 7C, the bottom 21 is no longer made in a single piece forming an arc of a circle, but in two parts 28 and 29 which open the bottom of the basket 4 by being released on each side by forced passages 30 and 31.

The following figures allow providing a concrete example of a manufactured apparatus, the capacity of this apparatus to cook food portions, the reduction in business costs by using this apparatus:

overall dimensions of the apparatus: 1.750 meters × 1.300 meters × 1.075 meters weight of the apparatus: about 300 kg number of baskets 4: sixteen (eight to eighteen baskets as needed)

capacity of the baskets 4: 50 to 250 grams of fresh pastry heating medium: 3 immersed resistors 6,000 W 220/350 V electric motor: 280 W 220 V 1,500 TM on a reducer 1/6 to 4 with a speed changing means.

| Speed Lever Position | Time for a Complete Rotation | Time for Cooking Steeping | One Basket Every | Portions per Hour | Kg/hour 150 gr Portion |
|---|---|---|---|---|---|
| A + ½ | 2' 4" | 1' | 9' 4/10 | 384 | 57.600 |
| B | 2' 33" | 1' 02" | 9' 5/10 | 376 | 56.400 |
| C | 2' 46" | 1' 06" | 10' 4/10 | 347 | 52.000 |
| D | 3' 16" | 1' 19" | 12' 2/10 | 294 | 44.100 |
| E | 3' 55" | 1' 36" | 14' 7/10 | 245 | 36.750 |
| F | 4' 45" | 1' 57" | 17' 8/10 | 202 | 30.300 |
| G | 5' 35" | 2' 10" | 20' 9/10 | 172 | 25,800 |
| H − ½ | 5' 41" | 2' 15" | 21' 3/10 | 169 | 25.350 |

Figure 9:
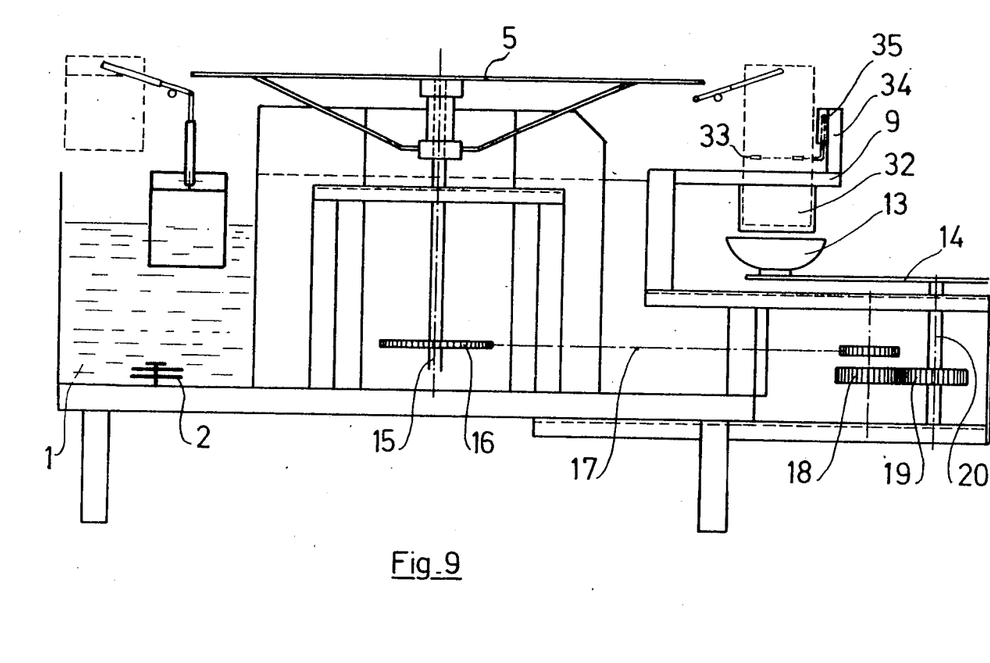
FIG. 9 is a sectional view of the apparatus according to another embodiment, in particular of the basket which had a square shape and is opened from the bottom.
Figure 10:
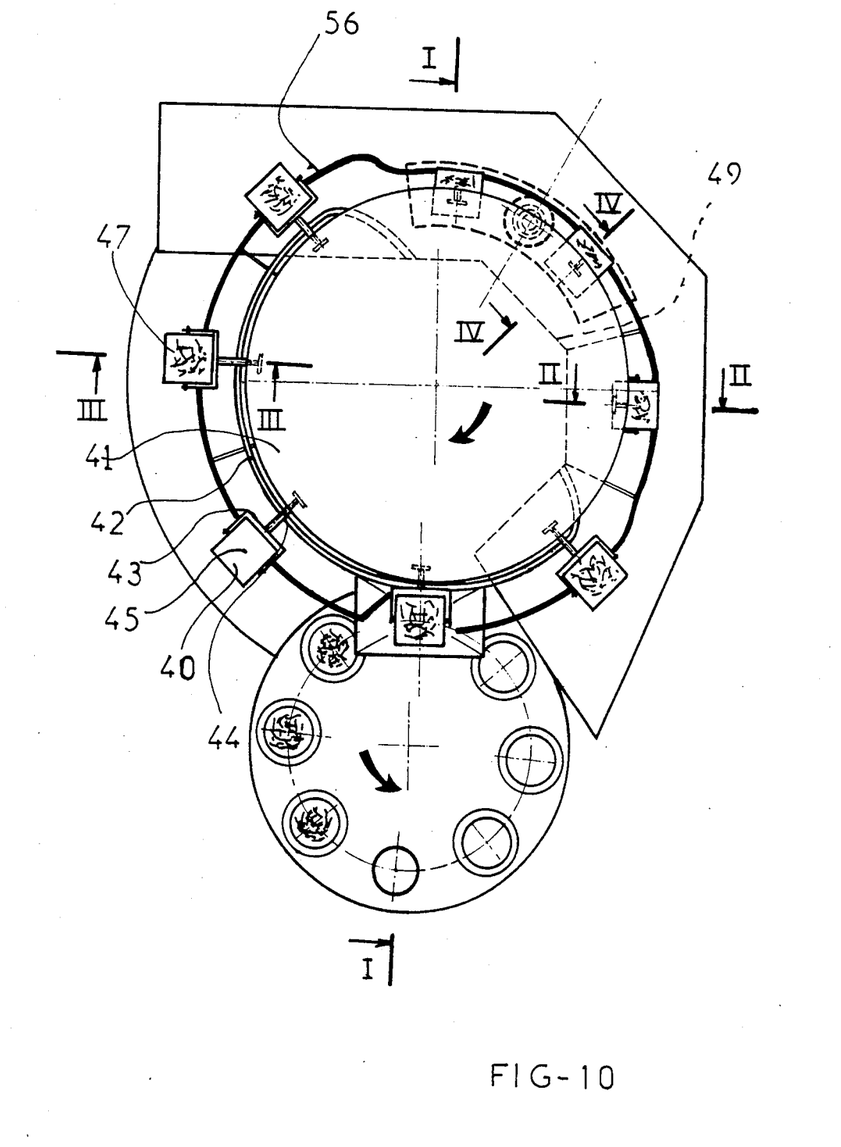
FIG. 10 is a plan view of the apparatus.
Figure 11:
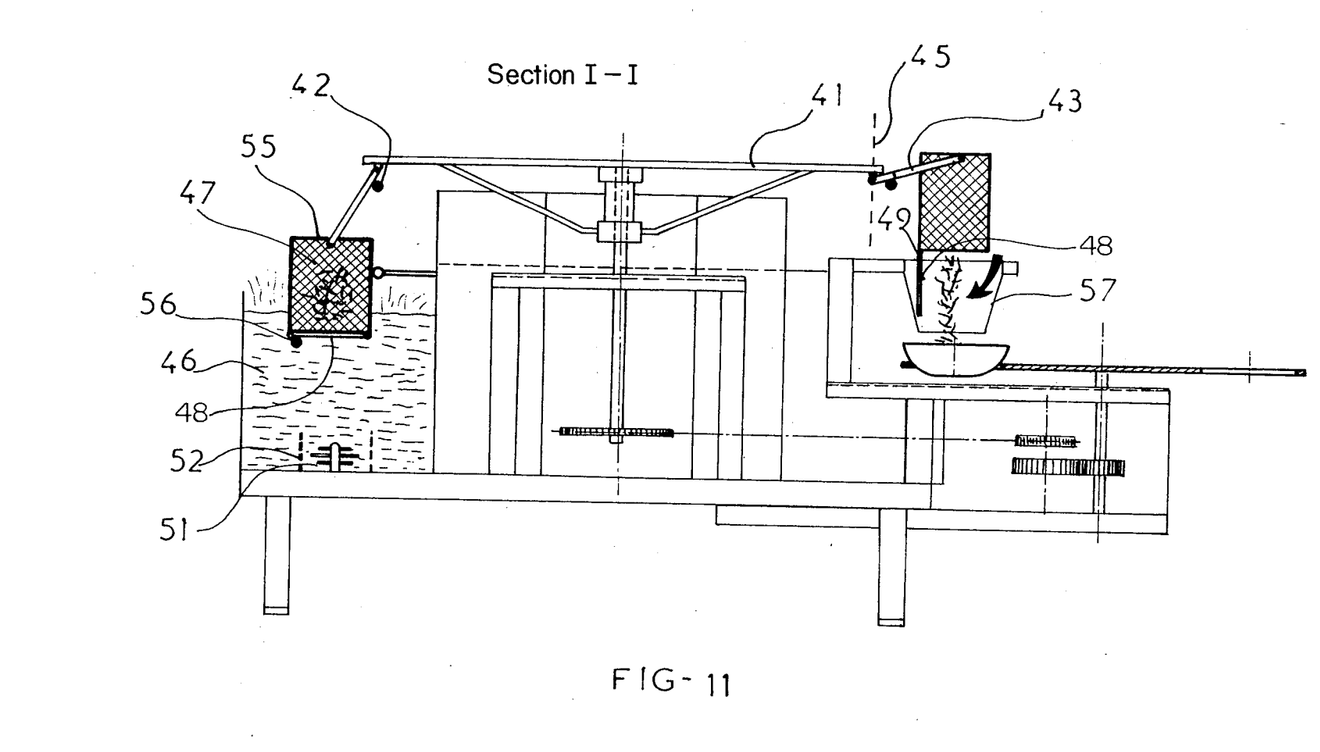
FIG. 11 is a sectional view along the axis I—I shown in FIG. 10. This view shows the entry of the suspended basket into the cooking liquid and the emptying of another suspended basket at the emptying station.
Figure 12:
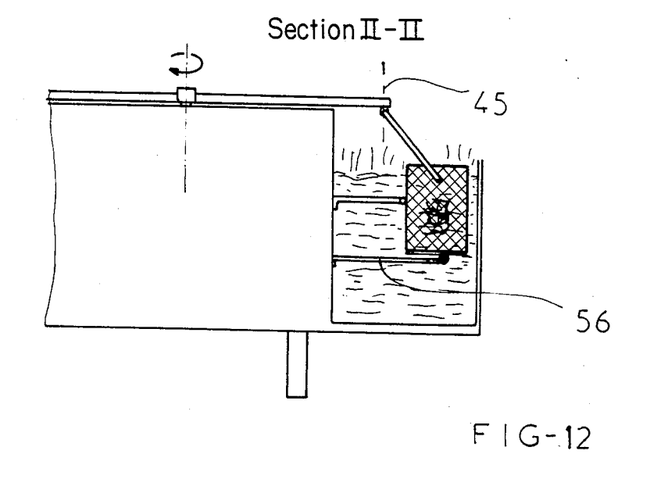
FIG. 12 is a sectional view along the axis II—II shown in FIG. 10. This view shows the entry of the suspended basket into the cooking liquid.
Figure 13:
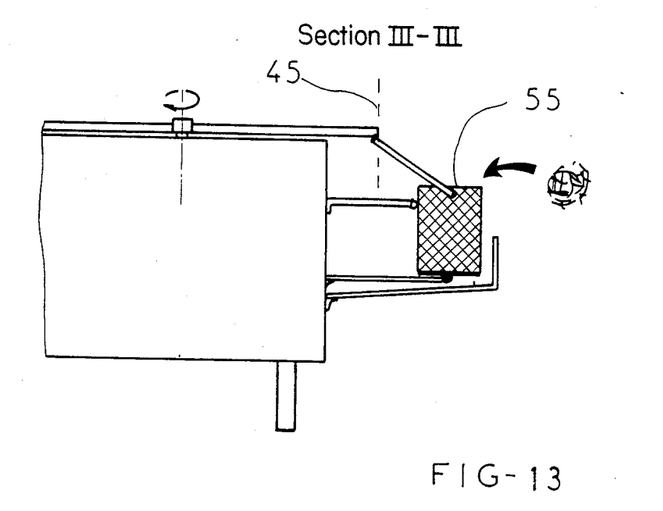
FIG. 13 is a sectional view along the axis III—III shown in FIG. 10. This view shows the filling stage of the suspended basket.

In FIG. 9, the basket 4 is square. The bottom 32 is mounted on an axle 33, about which it can turn to open said basket 4. When the basket 4 passes above the emptying funnel 9, a forced passage such as a cam 34 is abutted against a lug 35 mounted like a lever on said axle 33 of the bottom 32 of the basket 4, said lug 35 rotating and causing the bottom 32 to rotate about the axle 33, thereby opening the basket 4 which therefore empties the cooked food portion onto the plate 13.

According to the other embodiment the basket 40 suspended from the horizontal wheel 41, called a basket-carrying wheel, is no longer guided by one guiding ramp 42 only, but by two ramps. An upper guiding ramp 42 ensures moving said basket 40 about its point of securement at the level of the handle 43 and the hook 44 with respect to the vertical axis 45. This movement allows moving said basket 40 into and out of the cooking liquid 46. A lower ramp 56 ensures holding or opening the bottom surface 48 of the basket 40 mounted on the hinge 49. Likewise, the suspended basket 40 is completely immersed in the cooking liquid 46. This total immersion of the basket 40 ensures a better cooking of the foodstuffs 47 thanks to the agitation due to boiling and the continuous movement of said basket in the liquid.

Figure 14:
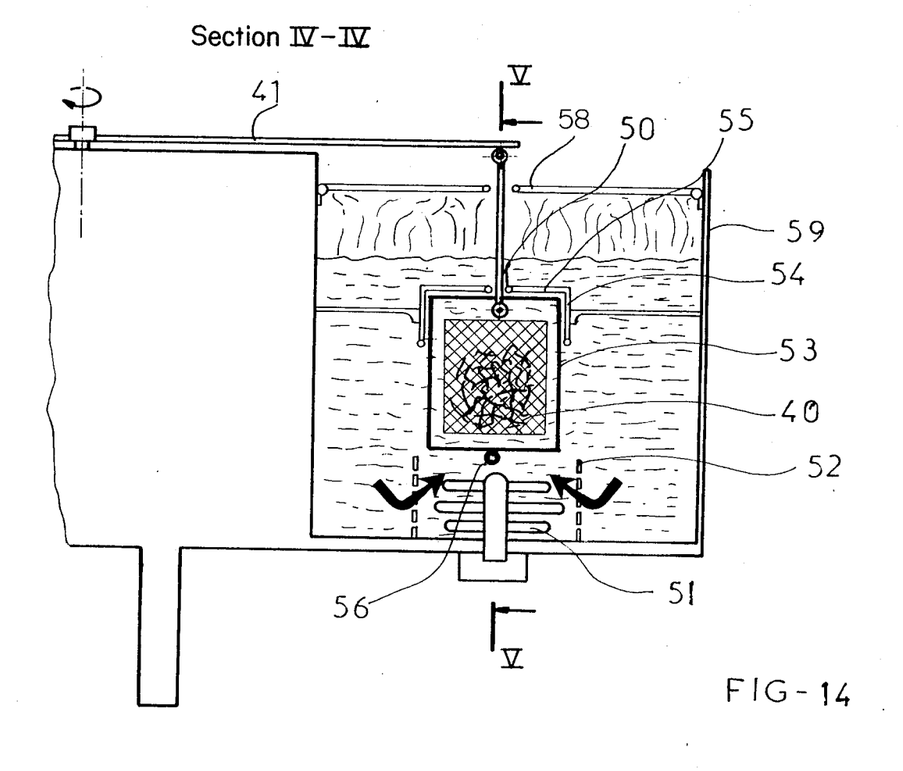
FIG. 14 is a sectional view along the axis IV—IV shown in FIG. 10. This view shows the total immersion stage of the suspended basket in the cooking liquid.
Figure 15:
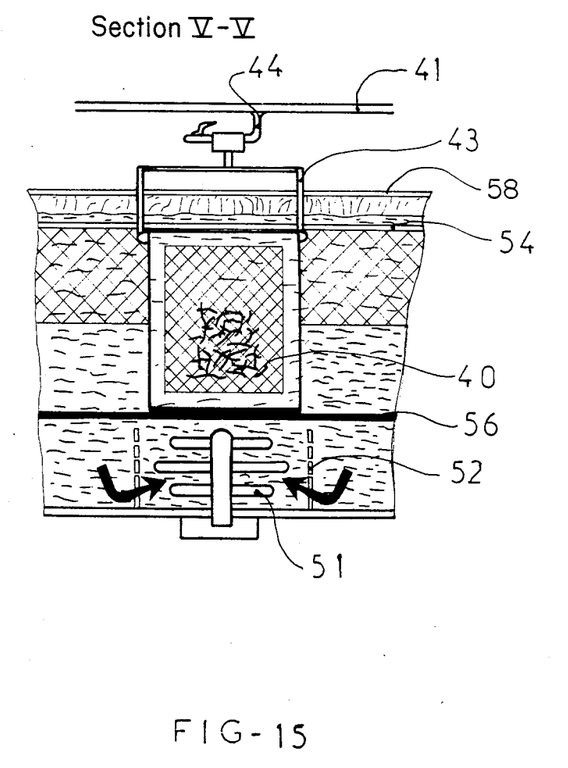
FIG. 15 is a schematic view along the axis V—V shown in FIG. 14.

As the upper part 55 of the basket is open during its passage in total immersion, the basket 40 passes through a tunnel 54 whose upper wall 5 closes the basket 40 by serving as a lid. Only a central slot 50 suitably positioned along the longitudinal axis of the tunnel 49 allows the passage of the handle 43 or the suspension arm which joins together the basket 40, its hook 44 and the horizontal wheel 41 called a basket-carrying wheel. Said tunnel 54 is provided with holes, thus it can be made of a grid material.

the heating resistors 51 are surrounded by a pierced vertical cylindrical wall 52. This pierced vertical cylindrical wall 52 ensures the circulation of the boiling cooking liquid 46 and the agitation of the foodstuffs 47 to be cooked, therefore ensuring a homogenous cooking. This agitation and this circulation are increased when a basket passes over the heating resistors, on the one hand, through the pierced vertical cylindrical wall and, on the other hand, through the immersed tunnel.

Figure 16:
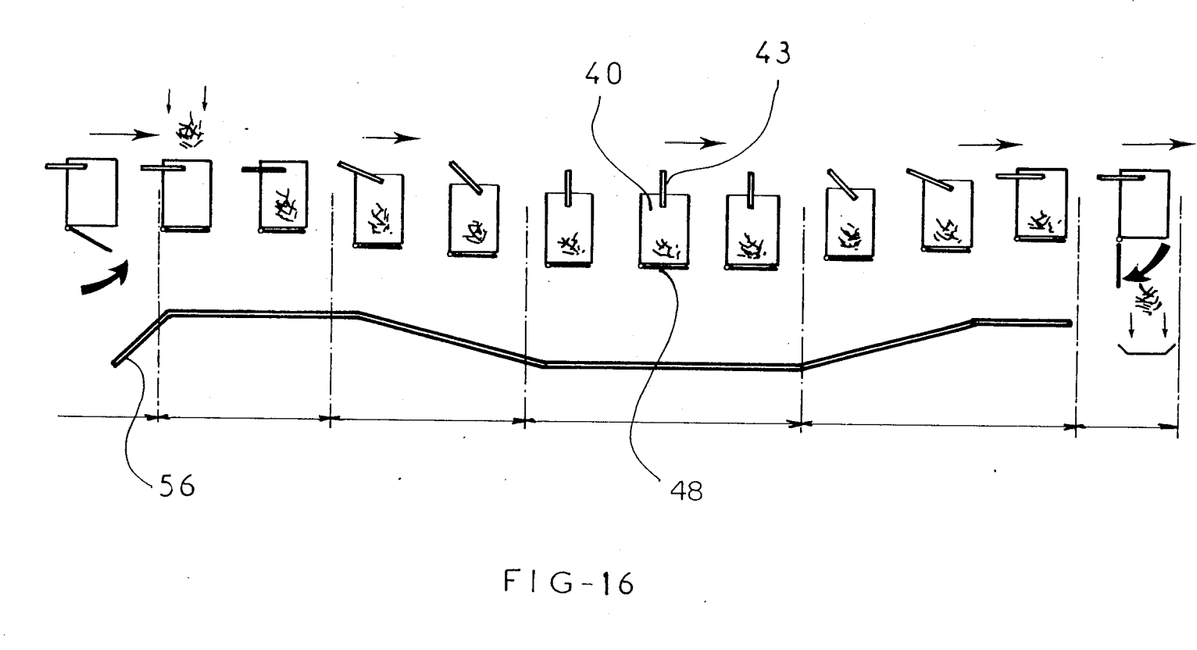
FIG. 16 is a schematic view of the suspended basket and the lower ramp shown in lateral view, so as to show the difference between the level of the basket and the level of the lower ramp following a complete cycle.

The basket 40 has preferably a square shape, the upper part 55 is open. The side walls are constituted by mountings or uprights to which a grid 53 is welded. The bottom 48 of the suspended basket 40 is mounted on a free hinge 49, without a spring, therefore, it has to be supported by a means 56 to remain in a closed position. Said means 56 is the lower ramp 56 which is positioned below the basket 40 and keeps the bottom 48 of said basket closed. This lower ramp 56 is substantially parallel to the upper guiding ramp 42. Except to the right of the emptying station 57 of the food portion from the basket, where the lower ramp 56 is discontinuous, therefore releasing the bottom 48 which can open. After emptying, the lower ramp 56 gradually closes the bottom 48 of said basket again, therefore ensuring its closure.

The suspended basket 40 is held by a jointed handle 43. The head of the handle is coupled to a securement hook 44 fixed to the basket-carrying wheel 41. A sealing and locking means can prevent the head of the handle from slipping out of the hook 44.

A closure 58 is disposed on the vessel 59 for the liquid, so as to reduce the evaporation rate, the energy costs and to increase the heating capacity. Said closure 58 is notched at the center so as to allow the passage of the handles 43 of the baskets 40.

I claim:

1. Apparatus for the automatic and continuous cooking of food portions, said apparatus comprising: baskets with bottoms for containing said food portions; a horizontal basket-carrying wheel from which said baskets are suspended; a vessel containing liquid to cook said food portions; a heating means for heating said liquid; an upper guiding ramp; and a lower guiding ramp; said upper guiding ramp having sloped ends so that when said wheel is rotated said baskets are guided down one sloped end into and through said liquid and are guided up said other sloped end to ascend from said liquid, said apparatus further comprising a second horizontal wheel at a lower level than said first horizontal wheel, said second horizontal wheel carrying plates, and means such that when said upper guide ramp guides said baskets over said plates the bottoms of said baskets open to allow said food portions to empty onto said plates, said bottoms being securely closed, at all places except over said plates, by said lower guide ramp.

2. Apparatus as in claim 1, wherein said baskets have a suspension arm to join said baskets to a hook connected to said horizontal basket-carrying wheel, said apparatus further comprising a tunnel within said liquid such that said baskets are passed through said tunnel, an upper wall of said tunnel having a closure with an opening to allow said arm to pass through.

3. Apparatus according to claim 2, wherein said tunnel comprises walls made of a grid material.

4. Apparatus as in claim 1, further comprising heating resistors surrounded by pierced vertical cylindrical walls, and means to circulate said liquid to heat said liquid and to agitate said food portions.

5. Apparatus for the automatic and continuous cooking of individual food portions, said apparatus comprising: baskets for containing said food portions; a horizontal basket-carrying wheel to which said baskets are attached; hooks for attaching said baskets to said wheel such that said baskets are pivotally connected on said hooks, and said hooks are pivotally connected to said wheel; a vessel located below said wheel and said baskets, said vessels containing liquid for cooking said portions; heating means for heating said liquid; a guide ramp located discontinuously around said wheel, said guide ramp having at one end a downwardly sloping portion and at an opposite end an upwardly sloping portion; wherein said baskets are located at the periphery of said wheel, said wheel being rotatable so that as the wheel rotates the baskets descend the downwardly sloping portion of the guide ramp, are moved through the vessel containing the liquid, and ascend the upwardly sloping portion of the guide ramp to be removed from said liquid and drained; said apparatus further comprising a funnel-shaped opening so that when said basket is inverted by a raised part of said guide ramp said food is emptied onto plates through said funnel-shaped opening.

6. Apparatus for the automatic and continuous cooking of individual food portions, said apparatus comprising: baskets for containing said food portions; a horizontal basket-carrying wheel to which said baskets are attached; hooks for attaching said baskets to said wheel; a vessel located below said wheel and said baskets, said vessels containing liquid for cooking said food portions; heating means for heating said liquid; a guide ramp located discontinuously around said wheel, said guide ramp having at one end a downwardly sloping portion and at an opposite end an upwardly sloping portion, wherein said baskets are located at the periphery of said wheel, said wheel being rotatable so that as the wheel rotates the baskets descend the downwardly sloping portion of the guide ramp, are moved through the vessel containing the liquid, and ascend the upwardly sloping portion of the guide ramp to be removed from said liquid and drained; wherein said apparatus further comprises a second horizontal wheel rotating in the opposite direction from the basket-carrying wheel, said second horizontal wheel positioning plates below said baskets at the moment when said baskets are being emptied.

7. Apparatus as in claim 6, further comprising an electric motor for driving said basket-carrying wheel; a pinion attached to an axle of said horizontal wheel; a double pinion connected to said pinion through a chain; and an axle connected to said double pinion and to the second horizontal wheel which carries said plates, said second wheel being rotated through the action of said pinion, said double pionion and said axle which is attached to said second wheel.

8. Apparatus for the automatic and continuous cooking of individual food portions, said apparatus comprising: baskets for containing said food portions; a horizontal basket-carrying wheel to which said baskets are attached; hooks for attaching said baskets to said wheel; a vessel located below said wheel and said baskets, said vessels containing liquid for cooking said food portions; heating means for heating said liquid; a guide ramp located discontinuously around said wheel, said guide ramp having at one end a downwardly sloping portion and at an opposite end an upwardly sloping portion; wherein said baskets are located at the periphery of said wheel, said wheel being rotatable so that as the wheel rotates the baskets descend the downwardly sloping portion of the guide ramp, are moved through the vessel containing the liquid, and ascend the upwardly sloping portion of the guide ramp to be removed from said liquid and drained, and wherein said basket is square and a bottom of a said basket is mounted on an axle about which it can turn to open said basket to allow said food portions to descend onto plates, a lug is mounted on said axle, and when said basket is over said plates said lug abuts a cam thereby rotating said lug, said axle, and said bottom of said basket to allow said food to descend.

* * * * *